(12) United States Patent
Sekiguchi et al.

(10) Patent No.: US 11,629,263 B2
(45) Date of Patent: Apr. 18, 2023

(54) PROCESSING FLUID, INK SET, INKJET PRINTING DEVICE, AND INKJET PRINTING METHOD

(71) Applicant: RICOH COMPANY, LTD., Tokyo (JP)

(72) Inventors: Satoyuki Sekiguchi, Kanagawa (JP); Toshiyuki Kobashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 226 days.

(21) Appl. No.: 17/130,725

(22) Filed: Dec. 22, 2020

(65) Prior Publication Data
US 2021/0198509 A1    Jul. 1, 2021

(30) Foreign Application Priority Data

Dec. 25, 2019 (JP) .............................. JP2019-234382
Sep. 16, 2020 (JP) .............................. JP2020-155512

(51) Int. Cl.
*C09D 11/38* (2014.01)
*C09D 11/54* (2014.01)
*B41M 5/00* (2006.01)
*C09D 11/102* (2014.01)

(52) U.S. Cl.
CPC ........... *C09D 11/38* (2013.01); *B41M 5/0011* (2013.01); *B41M 5/0023* (2013.01); *C09D 11/102* (2013.01); *C09D 11/54* (2013.01)

(58) Field of Classification Search
CPC ....... C09D 11/322; C09D 11/38; C09D 11/54; B41M 5/0017; B41M 7/0018; B41J 11/0015; C08L 83/04
See application file for complete search history.

(56) References Cited

U.S. PATENT DOCUMENTS

| | | | | | |
|---|---|---|---|---|---|
| 5,380,769 | A | * | 1/1995 | Titterington | B41M 3/001 524/556 |
| 6,270,214 | B1 | * | 8/2001 | Smith | B41M 5/529 347/100 |
| 6,777,462 | B2 | * | 8/2004 | Smith | C09D 11/40 524/404 |
| 2007/0019988 | A1 | * | 1/2007 | Facci | B32B 7/06 428/447 |
| 2016/0319186 | A1 | * | 11/2016 | Chopade | C09K 8/685 |
| 2019/0016911 | A1 | * | 1/2019 | Okamoto | C09D 11/40 |

(Continued)

FOREIGN PATENT DOCUMENTS

| | | |
|---|---|---|
| JP | 2013-199719 | 10/2013 |
| JP | 2014-055210 | 3/2014 |

(Continued)

OTHER PUBLICATIONS

U.S. Appl. No. 17/027,768, filed Sep. 22, 2020, Toshiyuki Kobashi, et al.

(Continued)

*Primary Examiner* — John Zimmermann
(74) *Attorney, Agent, or Firm* — Grüneberg and Myers PLLC

(57) ABSTRACT

A processing fluid contains a metal ion and an organopolysiloxane, wherein the content of the metal ion in the processing fluid is from 0.5 to 50 g/L and the organopolysiloxane has a weight average molecular of from 5,000 to 500,000.

9 Claims, 2 Drawing Sheets

(56) References Cited

U.S. PATENT DOCUMENTS

| | | | |
|---|---|---|---|
| 2019/0040272 A1* | 2/2019 | Ito | C08L 83/12 |
| 2019/0284419 A1 | 9/2019 | Kobashi et al. | |
| 2020/0101767 A1 | 4/2020 | Kobashi et al. | |
| 2020/0101782 A1 | 4/2020 | Sekiguchi et al. | |
| 2020/0139699 A1* | 5/2020 | Noguchi | B32B 5/024 |
| 2021/0277262 A1* | 9/2021 | Hasegawa | C09D 11/50 |

FOREIGN PATENT DOCUMENTS

| | | |
|---|---|---|
| JP | 2017-051952 | 3/2017 |
| JP | 2017-186702 | 10/2017 |
| JP | 2018-123235 | 8/2018 |

OTHER PUBLICATIONS

U.S. Appl. No. 17/070,062, filed Oct. 14, 2020, Toshiyuki Kobashi, et al.

U.S. Appl. No. 17/027,763, filed Sep. 22, 2020, Toshiyuki Kobashi, et al.

* cited by examiner

PROCESSING FLUID, INK SET, INKJET PRINTING DEVICE, AND INKJET PRINTING METHOD

CROSS-REFERENCE TO RELATED APPLICATIONS

This patent application is based on and claims priority pursuant to 35 U.S.C. § 119 to Japanese Patent Application Nos. 2019-234382 and 2020-155512, filed on Dec. 25, 2019 and Sep. 16, 2020, respectively, in the Japan Patent Office, the entire disclosures of which are hereby incorporated by reference herein.

BACKGROUND

Technical Field

The present disclosure relates to a processing fluid, an ink set, an inkjet printing device, and an inkjet printing method.

Description of the Related Art

Since inkjet printers are relatively quiet, have low running costs, and are capable of printing color images with ease, they are now widely used at home to output digital information.

Inkjet recording has been applied for dyeing on contexture fabric or fabric for knitting in addition to such home use.

The need for both conventional cotton and cotton/polyester blended media and sportswear is rapidly increasing in a field referred to as Direct to Garment (DTG) of direct printing on garment such as T-shirts, which requires polyester media compatibility. This trend applies to the entire dyeing field as well as the DTG. For inkjet printers with an unwinding and winding mechanism, the need for inkjet recording capable of producing robust images with excellent coloring on many types of fabrics including cotton and polyester is increasing more and more.

SUMMARY

According to embodiments of the present disclosure, a processing fluid is provided which contains a metal ion and an organopolysiloxane, wherein the content of the metal ion in the processing fluid is from 0.5 to 50 g/L and the organopolysiloxane has a weight average molecular of from 5,000 to 500,000.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
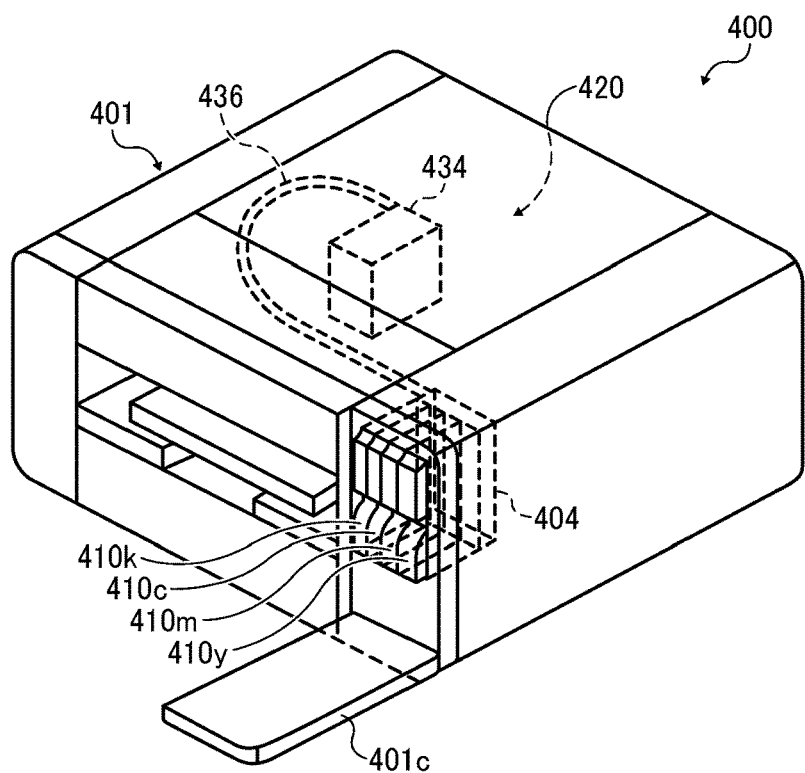
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a processing fluid is provided which enhances fastness of an image to fabric made of chemical fiber such as polyester and apply soft textures to the image.

The processing fluid contains a metal ion and an organopolysiloxane, wherein the content of the metal ion in the processing fluid is from 0.5 to 50 g/L and the organopolysiloxane has a weight average molecular of from 5,000 to 500,000.

The processing fluid of the present disclosure will be described below in detail with reference to several embodiments and accompanying drawings.

Metal Ion

The metal ion contained in the processing fluid of the present disclosure is selected from known ions. Specific examples include, but are not limited to, sodium ion, potassium ion, calcium ion, magnesium ion, and aluminum ion. These can be used alone or in combination.

The metal ion is present in the processing fluid in which a water-soluble metal salt is dissolved.

Such a metal salt can be selected from known salts.

Specific examples include, but are not limited to, a salt of carboxylic acid such as acetic acid and lactic acid, sulfate, nitrate, hydrochloride, and thiocyanate. Those metal salts can be used alone or in combination. Of these, carbonate, sulfate, nitrate, and chloride are preferable because these salts are dissolved well in water or water-soluble organic solvents. Calcium nitrate, calcium chloride, calcium acetate, magnesium nitrate, and sodium chloride are preferable in the present disclosure because these salts have good solubility and enhance permeation to fabric.

The content of the metal ion in the processing fluid is preferably from 0.5 to 50 g/L and more preferably from 5 to 30 g/L to enhance textures and fastness of images owing to control of permeation of fabric with the ink.

The metal ion and its content can be analyzed using methods such as inductively coupled plasma (ICP) atomic emission spectroscopy and ion chromatography.

Organopolysiloxane

The organopolysiloxane contained in the processing fluid of the present disclosure is not particularly limited.

Specific examples include, but are not limited to, organopolysiloxane such as dimethyl polysiloxane and modified organopolysiloxane such as polyether-modified organopolysiloxane, amino-modified organopolysiloxane, hydroxy-modified organopolysiloxane, epoxy-modified organopolysiloxane, and phenyl-modified organopolysiloxane. These can be used alone or in combination. Of these, dimethyl polysiloxane and/or amino-modified organopolysiloxane are preferable to apply textures to and enhance fastness of printed matter.

The organopolysiloxane can be synthesized by a known method such as hydrolysis condensation polymerization using chlorosilane or alkoxysilane and ring-opening polycondensation of cyclic siloxane.

Polymers are obtained by the ring-opening polycondensation of cyclic siloxane by ring-opening cyclic siloxane oligomers under the presence of an acid or basic catalyst in a particular condition.

Specific examples of the cyclic siloxane oligomer include, but are not limited to, dimethyl siloxane cyclic structures such as hexamethyl cyclotrisiloxane and octamethyl cyclotetrasiloxane, methylvinyl siloxane cyclic structures such as tetramethyl tetravinyl cyclotetrasiloxane, diphenyl siloxane cyclic structure such as octaphenyl cyclotetrasiloxane, and methyltrifluoro propylsiloxane cyclic structures such as trimethyl trifluoropropyl cyclotrisiloxane. These cyclosiloxiane oligomers can be used alone or mixtures thereof can be used.

The weight average molecular weight of such polymers can be controlled by terminating the polymerization reaction using a linear organopolysiloxane having a low molecular weight as an end capping agent.

Specific examples of the end capping agent include, but are not limited to, known chain reaction terminating agents such as trialkylsiloxy chain reaction terminating agents such as vinyl chain reaction terminating agents and methyl chain reaction terminating agents. These end-capping agents can be used alone or in combination as mixtures and can be selected to suit to a particular purpose of the final product. The processing fluid preferably contains 0.0001 to 10 parts by mass of the end capping agent to 100 parts of the cyclic siloxane oligomer.

Specific examples of the basic catalyst for use in the ring-opening polycondensation of cyclic siloxane oligomer include, but are not limited to, potassium hydroxide, tetramethyl ammonium hydroxide, and tetrabutyl phosphonium hydroxide.

Specific examples of the acid catalyst for use in the ring-opening polycondensation of cyclic siloxane oligomer include, but are not limited to, sulfuric acid, trifluoro methane sulfonic acid, activated clay, and phosphonitrile chloride.

The weight average molecular weight of the synthesized organopolysiloxane can be measured by gel permeation chromatography (GPC).

The weight average molecular weight of the organopolysiloxane is preferably from 5,000 to 500,000 and particularly preferably from 20,000 to 200,000 to achieve good textures and enhance fastness of printed products.

The weight average molecular weight is measured by GPC in the following condition.

Instrument: GPC-8020 (manufactured by TOSOH CORPORATION)
Column: TSK G2000 HXL and G4000 HXL (manufactured by TOSOH CORPORATION)
Temperature: 40 degrees C.
Solvent: Tetrahydrofuran (THF)
Flow rate: 1.0 mL/min.

The organopolysiloxane is preferably dispersed in the processing fluid and is more preferably dispersed in the processing fluid in the form of particle owing to a surfactant. The particle diameter of the organopolysiloxane is, for example, from 50 to 10,000 nm.

The organopolysiloxane can be dispersed by a known method such as emulsion polymerization or phase inversion emulsification. Any emulsifiers can be used. Specific example include, but are not limited to, a homomixer, homogenizer, colloidal mill, universal mixer and stirrer, combimix, and line mixer. The solid content concentration of the organopolysiloxane is preferably from 10 to 70 percent by mass and more preferably from 20 to 50 percent by mass.

The surfactant to disperse the organopolysiloxane is not particularly limited and can be selected from nonionic surfactants, anionic surfactants, cationic surfactants, and amphoteric ionic surfactants.

Specific examples of the nonionic surfactant include, but are not limited to, polyoxyalkylene alkyl ether such as polyoxyethylene alkyl ether, and polyoxyethylene propylene alkyl ether and polyoxyethylene alkyl aliphatic acid esters.

Specific examples of the cationic surfactant include, quaternary ammonium salts and alkyl amine acetates.

Specific examples of the anionic surfactants include, but are not limited to, alkyl sulfate, alkyl benzene sulfonate, alkyl sulfo succinate, polyoxyethylene alkyl ether sulfate, and polyoxyethylene alkylphenylether sulfate. These solvents can be used alone or in combination.

When the compound represented by the following Chemical Formula 1 is contained as a surfactant to disperse the organopolysiloxane in the present disclosure, it improves storage stability of the processing fluid under the presence of the metal ion.

$$CH_3(CH_2)_mO(C_2H_4O)_nH \quad (1)$$

where m represents an integer of from 10 to 16 and n represents an integer of from 6 to 12.

The compound represented by Chemical Formula 1 can be procured. Specific examples include, but are not limited to, EMALEX 707 (polyoxyethylene (7) laurylether, m=11, n=7), EMALEX 712 (polyoxyethylene (12) laurylether, m=11, n=12), EMALEX 107 (polyoxyethylene (7) cetylether, m=15, n=7), EMALEX 112 (polyoxyethylene (12) cetylether, m=15, n=12), EMALEX 115 (polyoxyethylene (15) cetylether, m=15, n=15), EMALEX 606 (polyoxyethylene (6) stearylether, m=16, n=6), and EMALEX 612 (polyoxyethylene (12) stearylether, m=16, n=12), all manufactured by NIHON EMULSION Co., Ltd.

The proportion of the organopolysiloxane in the processing fluid is preferably from 0.1 to 20.0 percent by mass and particularly preferably from 0.5 to 10 percent by mass to achieve good textures and enhance fastness of printed products.

In the present disclosure, the processing fluid preferably has a dynamic surface tension of from 20 to 50 mN/m and more preferably from 25 to 40 mN/m at a life time of 150 msec at 25 degrees C. to achieve good textures and enhance fastness of printed products because it quickly wets and spreads on fiber of fabric made of chemical fiber such as polyester.

The dynamic surface tension can be controlled by changing the type and the amount of a surfactant added to the ink.

Dynamic surface tension can be measured by known methods. It is preferable to employ the maximum bubble pressure technique in the present disclosure. Instruments employing the maximum bubble pressure technique for measuring dynamic surface tension instrument are procurable. A specific example is DynoTester (manufactured by SITA Messtechnik GmbH).

In the maximum bubble pressure technique, dynamic surface tension is obtained from the maximum pressure required to discharge the air bubbles from the front portion of a probe immersed in a target liquid (ink).

The maximum pressure is shown when the radius of the air bubbles is equal to the radius of the front portion of the probe, and the dynamic surface tension σ of the ink is obtained by the following equation.

$$\sigma = (\Delta P \cdot r)/2$$

In the equation, r represents the radius of the front portion of a probe and $\Delta P$ represents the difference between the maximum and minimum pressure applied to an air bubble.

The life time means the time from when a new surface is formed after an air bubble is released from a probe to the time when the next maximum bubble pressure appears in the maximum bubble pressure technique.

The processing fluid may contain a flocculant, an organic solvent, water, a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in ink. Other material for use in known processing fluid can be used.

The type of the flocculant is not particularly limited. For example, water-soluble cationic polymers, acids, and multivalent metal salts are suitable.

Surfactant

It is preferable to use silicone-based surfactants in combination with the organopolysiloxane in the processing fluid of the present disclosure to achieve good textures and enhance fastness of printed products. It is suitable to use the silicone-based surfactant used in the ink mentioned below. As described above, the compound represented by the Chemical Formula 1 illustrated above is also preferable as the surfactant.

The proportion of the surfactant in the processing fluid of the present disclosure is preferably from 0.05 to 2.00 percent by mass and more preferably from 0.06 to 1.90 percent by mass.

The ink set of the present disclosure contains the present disclosure of the present disclosure and an ink. The ink will be described below.

Ink

The organic solvent, water, coloring material, resin, and additive for use in the ink are described below.

Organic Solvent

There is no specific limitation to the organic solvent for use in the present disclosure. For example, a water-soluble organic solvent can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying at the same time.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutyl ether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water of the ink is not particularly limited and can be suitably selected to suit to a particular application. For example, in terms of enhancing the drying and discharging reliability of the ink, the proportion is preferably from 10 to 90 percent by mass and more preferably from 20 to 60 percent by mass.

Coloring Material

The coloring material has no particular limitation and includes materials such as a pigment and a dye.

The pigment includes an inorganic pigment or an organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

The ink is obtained by introducing a hydrophilic functional group into a pigment to prepare a self-dispersible pigment, coating the surface of a pigment with a resin followed by dispersion, or using a dispersant to disperse a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

When a dispersant is used, a known dispersant having a small or large molecular weight represented by a surfactant is used.

It is possible to select an anionic surfactant, a cationic surfactant, a nonionic surfactant, an amphoteric surfactant, or others depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerateing.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. The resin particle can be used alone or in combination.

The ink preferably contains a urethane resin and more preferably a polyester-based urethane resin to achieve good fastness and soft textures of printed products (images) in the present disclosure. Urethane resin is described next.

Urethane Resin

The urethane resin mentioned above has a soft segment derived from the polymer polyol portion and optionally a hard segment derived from polyamine or a short chain polyol portion. Elastic and robust urethane resins can be formed because the soft segment portions interact each other and the hard segment portions interact each other, which results in production of robust images.

Method for Manufacturing Urethane Resin

The urethane resin mentioned above can be manufactured by any of known methods including the following method.

First, a polymer polyol and optionally a short-chain polyol, a polyhydric alcohol having an anionic group, and a polyisocyanate are allowed to react with polyisocyanate in the absence of a solvent or the presence of an organic solvent to manufacture an isocyanate-terminated urethane prepolymer or an organic solvent solution of an isocyanate-terminated urethane prepolymer.

After water is poured to the isocyanate-terminated urethane prepolymer or the organic solvent solution of an isocyanate-terminated urethane prepolymer and disperse it, the obtained dispersion is allowed to react with polyamine for chain elongation reaction followed by removing the organic solvent in the system, if desired.

Specific examples of the organic solvent include, but are not limited to, ketones such as acetone and methylethyl ketone, ethers such as tetrahydrofuran and dioxane, acetic acid esters such as ethyl acetate and butylacetate, nitriles such as acetonitrile, and amides such as dimethyl formamide, N-methyl pyrrolidone, and 1-ethyl-2-pyrrolidone. These can be used alone or in combination.

Known polymer polyols can be used as those mentioned above. Examples include, but are not limited to, polycarbonate-based polymer polyol, polyether-based polymer polyol, polyester-based polymer polyol, and polycaprolactone-based polymer polyol. These can be used alone or in combination.

Of these, polyester-based polymer polyols are preferable to enhance fastness of images to polyester fabric.

The number average molecular weight of the polymer polyol mentioned above is preferably from 300 to 5,000 and more preferably from 500 to 3,000. The fastness and attachability of images may deteriorate outside this range.

Specific examples of the short-chain polyol include, but are not limited to, polyhydric alcohols having 2 to 15 carbon atoms such as ethylene glycol, propylene glycol, 1,4-butanediol, 1,5-pentanediol, neopentyl glycol, 1,6-hexanediol, 1,8-octanediol, 1,4-cyclohexane dimethanol, diethylene glycol, glycerin, and trimethylolpropane.

Specific examples of the polyisocyanate include, but are not limited to, aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenyl methane diisocyanate (MDI), 2,4-diphenyl methane diisocyanate, 4,4'-diisocyanate biphenyl, 3,3'-dimethyl-4,4'-diisocyanate biphenyl, 3,3'-dimethyl-4,4'-diisocyanate diphenyl methane, 1,5-naphthylene diisocyanate, 4,4'4''-triphenyl methane triisocyanate, m-isocyanate phenyl sulphonyl isocyanate, and p-isocyanate phenyl sulfonyl isocyanate; aliphatic polyisocyanates compounds such as ethylene diisocyanate, tetramethylene diisocyanate, hexamethylene diisocyanate (HDI), dodecamethylene diisocyanate, 1,6,11-undecane triisocyanate, 2,2,4-trimethyl hexamethylene diisocyanate, lysine diisocyanate, 2,6-diisocyanate methylcaproate, bis(2-isocyanate ethyl)fumarate, bis(2-isocyanatoethyl)carbonate, and 2-isocyanate ethyl-2,6-diisocyanate hexanoate; and alicyclic polyisocyanate compounds such as isophorone diisocyanate 4,4'-dicyclohexyl methane diisocyanate (hydrogenated MDI), cyclohexylene diisocyanate, methylcyclohexylene diisocyanate (hydrogenated TDI), bis(2-isocyanatoethyl)-4-dichlorohexene-1,2-dicarboxylate, 2,5-norbornane diisocyante, and 2,6-norbornane diisocyante. These can be used alone or in combination.

Of these, aliphatic polyisocyanate compounds and alicyclic polyisocyanate compounds are preferable, alicyclic polyisocyanate compounds are more preferable, and isophorone diisocyanate and 4,4'-dicyclohexylmethane diisocyanate are particularly preferable.

Specific examples of the polyamine include, but are not limited to, diamines such as ethylene diamine, 1,2-propane diamine, 1,6-hexamethylene diamine, piperazine, 2,5-dimethyl piperazine, isophorone diamine, 4,4'-dicyclohexyl methane diamine, and 1,4-cyclohexane diamine, polyamines such as diethylene triamine, dipropylene triamine, and triethylene tetramine, hydrazines, hydrazines such as N,N'-dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide.

The urethane resin optionally has a chemical cross linking derived from covalent bond in its molecular structure in addition to the hydrogen bond, which is one of the original features. Because of the cross-linking derived from covalent bond, images having strong chemical resistance can be produced and the laminate strength thereof by dry lamination can be enhanced.

Such chemical bonds are introduced by using tri- or higher polymer polyol, short chain polyol, polyisocyanate, and polyamine.

Any of the methods of introducing the chemical cross-linking into the urethane resin may be used alone or in combination.

Specific examples of the anionic group include, but are not limited to, carboxyl group and sulfonate group.

Anionic groups can be introduced by using a polyol having an anionic group.

Specific examples of the polyols having the anionic group mentioned above include, but are not limited to, 2,2-dimethylol propionic acid, 2,2-dimethylol butane acid, 2,2-dimethylol heptane acid, and 2,2-dimethylol octane acid.

Specific examples of neutralizing agents usable for neutralizing the anionic groups include, but are not limited to, organic amines such as ammonium, triethylamine, pyridine, and morpholine, basic compounds such as alkanolamines such as monoethanol amine, and water-soluble alkaline inorganic groups containing metals such as Na, K, Li, and Ca.

The mean volume diameter (i.e., volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image fastness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. To secure fixability and storage stability of the ink, it is preferably from 1 to 30 percent by mass and more preferably from 5 to 20 percent by mass of the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles and particles of pigment. The particle diameter can be measured by using a particle size analyzer (Nanotrac Wave-UT151, manufactured by MicrotracBEL Corp).

Additive

The ink may furthermore optionally contain additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Such surfactants can be synthesized or procured. Products are available from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

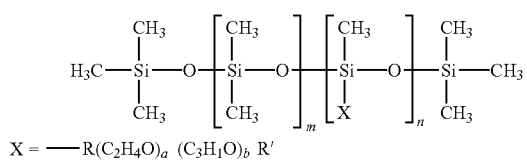

$X = \text{—} R(C_2H_4O)_a (C_3H_1O)_b R'$

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical Formula F-1 or Chemical Formula F-2 is more preferable.

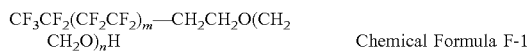

Chemical Formula F-1

In the Chemical Formula F-1, "m" is preferably 0 or an integer of from 1 to 10 and "n" is preferably 0 or an integer of from 1 to 40.

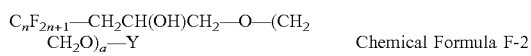

Chemical Formula F-2

In the compound represented by the Chemical Formula F-2, Y represents H or $C_mF_{2m+1}$, where m represents an integer of from 1 to 6, or $CH_2CH(OH)CH_2-C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant is commercially available. Specific examples include, but are not limited to, SURFLON S-111, S-112, S-113, S-121, S-131, S-132, S-141, and 5-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit and examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application. For example, viscosity, dynamic surface tension, and pH are preferable in the following ranges.

Viscosity of the ink at 25 degrees C. is preferably from 5 to 30 mPa·s and more preferably from 5 to 25 mPa·s because print density and text quality improve and good dischargibility is demonstrated. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes.

The dynamic surface tension of the ink is preferably 35 mN/m or less and more preferably 32 mN/m or less at 25 degrees C. because the ink suitably levels on a recording medium and the ink is dried in a shorter time. pH of the ink is preferably from 7 to 12 and more preferably from 8 to 11 in terms of prevention of corrosion of metal material in contact with liquid.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Recording Medium

The recording medium for use in recording is not particularly limited. Specific examples include, but are not limited to, plain paper, gloss paper, special paper, cloth, film, transparent sheets, and printing paper for general purposes.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

The inkjet printing device of the present disclosure includes a device to apply the processing fluid of the present disclosure to a recording medium and a discharging device to discharge an ink to the recording medium.

Figure 3:
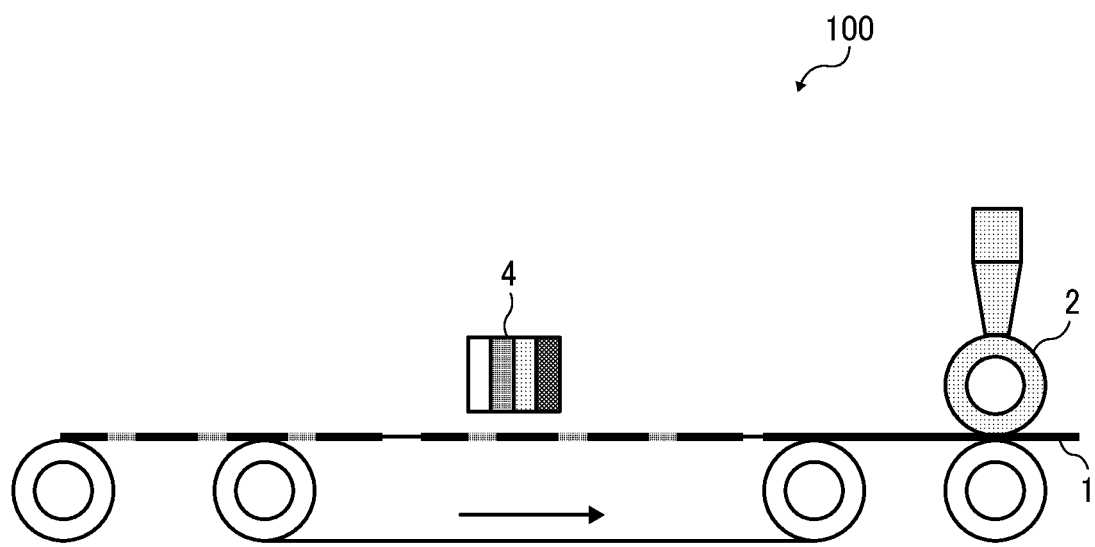
FIG. 3 is a diagram illustrating a schematic diagram illustrating an example of the inkjet printing device using the processing fluid of the present disclosure according to an embodiment of the present disclosure.

FIG. 3 is a schematic diagram illustrating an example of the inkjet printing device 100 using the processing fluid of the present application. The inkjet printing device 100 includes a device 2 to apply the processing fluid of the present disclosure to a recording medium 1 and a discharging device 4 configured to discharge an ink to the recording medium 1.

The inkjet printing method of the present disclosure includes applying the processing fluid of the present disclosure to a recording medium and discharging an ink to the recording medium.

It is preferable to apply the processing fluid to a recording medium and thereafter discharge an ink to where the processing fluid has been applied in the inkjet printing device and the inkjet printing method of the present disclosure.

Recorded Matter

Ink recorded matter includes a recording medium and an image formed on the recording medium with the ink contained in the ink set of the present disclosure.

The recorded matter is obtained by an inkjet recording device executing an inkjet recording method.

Recording Device and Recording Method

The ink in the ink set of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing fluids to a recording medium and a method of recording utilizing such a device. The recording medium means an item to which ink or various processing fluids can be temporarily or permanently attached.

The recording device may further optionally include a device relating to feeding, conveying, and ejecting a recording medium and other devices referred to as a pre-processing device, a post-processing device in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. It is possible to heat and dry a recording medium before, during, and after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium such as AO and a continuous printer capable of using continuous paper reeled up in a roll form as recording media.

Figure 2:
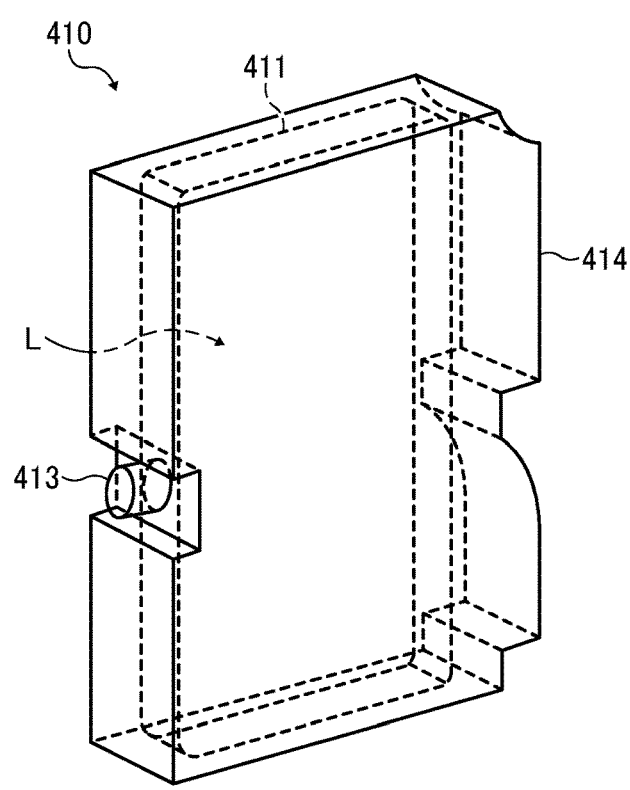
FIG. 2 is a diagram illustrating a perspective view of an example of a tank of an inkjet recording device.

The recording device is described using an example with reference to FIG. 1 and FIG. 2. FIG. 1 is a diagram illustrating a perspective view of the recording device. FIG. 2 is a diagram illustrating a perspective view of a tank. An image forming device 400, which is an embodiment of the recording device, is a serial type image forming device. A mechanical assembly 420 is disposed in an exterior 401 of the image forming device 400. Each ink accommodating unit (container) 411 of each tank (ink accommodating unit) 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening formed when a cover 401c is opened. The cartridge holder 404 is detachably attached to the tank 410. In this configuration, each ink discharging outlet 413 of the tank 410 communicates with a discharging head 434 for each color via a supplying tube 436 for each color and the ink can be discharged from the discharging head 434 to a recording medium.

This recording device may include not only a portion to discharge ink but also a device referred to as a pre-processing device and a post-processing device.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

Notably, the ink is applicable not only to the inkjet recording but can be widely applied in other methods.

Specific examples of such methods other than the inkjet recording include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to produce two-dimensional text and images and furthermore used as a material for solid fabrication for manufacturing a solid fabrication object (or solid freeform fabrication object).

The solid fabrication apparatus to fabricate a solid fabrication object can be any known device with no particular limit. For example, the apparatus includes a container, supplying device, discharging device, drier of ink, and others. The solid fabrication object includes an object manufactured by repetitively coating ink. In addition, the solid fabrication object includes a mold-processed product manufactured by processing a structure having a substrate such as a recording medium to which the ink is applied. The molded processed product is manufactured from recorded matter or a structure having a form such as a sheet-like form, and film-like form. by, processing such as heating drawing or punching. The molded processed product is suitably used for articles which are molded after surface-decorating. Examples are products such as gauges or operation panels of vehicles, office machines, electric and electronic devices, and cameras.

Terms such as image forming, recording, printing, and print used in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto. Parts represents parts by mass.

Unless otherwise specified, the processing fluids were prepared and evaluated at the room temperature of 25 degrees C. and humidity of 60 percent.

Synthesis of Organopolysiloxane Particle Liquid Dispersion

1. Organopolysiloxane Particle Liquid Dispersion 1

A total of 500 parts of octamethylcyclo tetrasiloxane, 4 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 1.

This organopolysiloxane 1 had a weight average molecular weight (Mw) of 88,000 by GPC.

The liquid mixture of 400 parts of the organopolysiloxane 1, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 1.

2. Organopolysiloxane Particle Liquid Dispersion 2

A total of 500 parts of octamethylcyclo tetrasiloxane, 7 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 2.

This organopolysiloxane 2 had a weight average molecular weight (Mw) of 20,000 by GPC.

The liquid mixture of 400 parts of the organopolysiloxane 2, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 2.

3. Organopolysiloxane Particle Liquid Dispersion 3

A total of 500 parts of octamethylcyclo tetrasiloxane, 9 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 3.

This organopolysiloxane 3 had a weight average molecular weight (Mw) of 17,000 by GPC.

The liquid mixture of 400 parts of the organopolysiloxane 3, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 3.

4. Organopolysiloxane Particle Liquid Dispersion 4

A total of 500 parts of octamethylcyclo tetrasiloxane, 12 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 4.

This organopolysiloxane 4 had a weight average molecular weight (Mw) of 5,000 by GPC.

The liquid mixture of 400 parts of the organopolysiloxane 4, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 4.

5. Organopolysiloxane Particle Liquid Dispersion 5

A total of 500 parts of octamethylcyclo tetrasiloxane, 2 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 5.

This organopolysiloxane 5 had a weight average molecular weight (Mw) of 200,000 by GPC.

The liquid mixture of 400 parts of the organopolysiloxane 5, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 5.

6. Organopolysiloxane Particle Liquid Dispersion 6

A total of 500 parts of octamethylcyclo tetrasiloxane, 1.8 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 6.

This organopolysiloxane 6 had a weight average molecular weight (Mw) of 220,000 by GPC.

The liquid mixture of 400 parts of the organopolysiloxane 6, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 6.

7. Organopolysiloxane Particle Liquid Dispersion 7

A total of 500 parts of octamethylcyclo tetrasiloxane, 0.9 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 7.

This organopolysiloxane 7 had a weight average molecular weight (Mw) of 500,000 by GPC.

The liquid mixture of 400 parts of the organopolysiloxane 7, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 7.

8. Organopolysiloxane Particle Liquid Dispersion 8

A total of 500 parts of octamethylcyclo tetrasiloxane, 20 parts of 3-(2-aminoethylamino)propyl methyldimethoxy silane, 4 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 8.

This organopolysiloxane 8 had a weight average molecular weight (Mw) of 98,000 by GPC.

The liquid mixture of 400 parts of the organopolysiloxane 8, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 8.

9. Organopolysiloxane Particle Liquid Dispersion 9

A total of 500 parts of octamethylcyclo tetrasiloxane, 15 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 9.

This organopolysiloxane 9 had a weight average molecular weight (Mw) of 4,200 by GPC.

The liquid mixture of 400 parts of the organopolysiloxane 9, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 9.

10. Organopolysiloxane Particle Liquid Dispersion 10

A total of 500 parts of octamethylcyclo tetrasiloxane, 0.8 parts of hexamethyl disiloxane, and 0.4 parts of potassium hydroxide were loaded into a reaction container equipped with a stirrer, a thermometer, and an efflux cooling tube in a nitrogen atmosphere followed by heating at 120 degrees C. for three hours. Subsequent to neutralization, the resulting mixture was heated with a reduced pressure at 120 degrees C. for three hours followed by filtration to obtain an oily organopolysiloxane 10.

This organopolysiloxane 10 had a weight average molecular weight (Mw) of 540,000 by GPC.

The liquid mixture of 400 parts of the organopolysiloxane 10, 20 parts of polyoxyethylene (4) lauryl ether, 20 parts of polyoxyethylene (20) cetylether, and 40 parts of deionized water were emulsified with a homomixer. To this emulsion, 520 parts of deionized water was added to prepare an organopolysiloxane particle liquid dispersion 10.

11. Organopolysiloxane Particle Liquid Dispersion 11

A liquid mixture of 400 parts of the organopolysiloxane 1, 20 parts of polyoxyethylene (7) lauryl ether (EMALEX 707, manufactured by NIHON EMULSION Co., Ltd.), 20 parts of polyoxyethylene (15) cetylether (EMALEX 115, manufactured by NIHON EMULSION Co., Ltd.), and 40 parts of deionized water were emulsified with a homomixer. To this emulsion, 520 parts of deionized water was added to prepare an organopolysiloxane particle liquid dispersion 11.

12. Organopolysiloxane Particle Liquid Dispersion 12

A liquid mixture of 400 parts of the organopolysiloxane 1, 20 parts of polyoxyethylene (4) lauryl ether, 20 parts of polyoxyethylene (12) cetylether (EMALEX 112, manufactured by NIHON EMULSION Co., Ltd.), and 40 parts of deionized water were emulsified with a homomixer. To this emulsion, 520 parts of deionized water was added to prepare an organopolysiloxane particle liquid dispersion 12.

13. Organopolysiloxane Particle Liquid Dispersion 13

A liquid mixture of 400 parts of the organopolysiloxane 1, 20 parts of polyoxyethylene (4) lauryl ether, 20 parts of polyoxyethylene (12) stearylether (EMALEX 612, manufactured by NIHON EMULSION Co., Ltd.), and 40 parts of deionized water were emulsified with a homomixer. To this emulsion, 520 parts of deionized water was added to prepare an organopolysiloxane particle liquid dispersion 13.

14. Organopolysiloxane Particle Liquid Dispersion 14

A liquid mixture of 400 parts of the organopolysiloxane 1, 20 parts of polyoxyethylene (7) lauryl ether (EMALEX 707, manufactured by NIHON EMULSION Co., Ltd.), 20 parts of polyoxyethylene (12) cetylether (EMALEX 112, manufactured by NIHON EMULSION Co., Ltd.), and 40 parts of deionized water were emulsified with a homomixer. To this emulsion, 520 parts of deionized water was added to prepare an organopolysiloxane particle liquid dispersion 14.

15. Organopolysiloxane Particle Liquid Dispersion 15

A liquid mixture of 400 parts of the organopolysiloxane 1, 20 parts of polyoxyethylene (7) lauryl ether (EMALEX 707, manufactured by NIHON EMULSION Co., Ltd.), 20 parts of dodecylbenzene sodium sulfonate (manufactured by FUJIFILM Wako Pure Chemical Corporation), and 40 parts of deionized water were emulsified with a homomixer. To this emulsion, 520 parts of deionized water was added to prepare an organopolysiloxane particle liquid dispersion 15.

16. Organopolysiloxane Particle Liquid Dispersion 16

A liquid mixture of 400 parts of the organopolysiloxane 1, 20 parts of polyoxyethylene (12) cetyl ether (EMALEX 112, manufactured by NIHON EMULSION Co., Ltd.), 20 parts of dodecylbenzene sodium sulfonate (manufactured by FUJIFILM Wako Pure Chemical Corporation), and 40 parts of deionized water were emulsified with a homomixer. To this emulsion, 520 parts of deionized water was added to prepare an organopolysiloxane particle liquid dispersion 16.

Preparation of Processing Fluid

The recipes shown in Table 1 were mixed and stirred for one hour. The resulting mixtures were filtered with a 1.2 μm cellulose acetate membrane filter under a pressure to obtain processing fluids. Parts in Table 1 represents parts by mass and the total is 100 parts by mass. The dynamic surface tension at a life time of 150 ms at 25 degrees C. was measured according to the method mentioned above and shown in Table 1. The content of the metal ion in the processing fluid and the weight average molecular weight (Mw) of the organopolysiloxane were shown in Table 1. The metal ion was measured by the ICP mentioned above. The weight average molecular weight (Mw) was measured as described above.

Storage Stability

A total of 5 g of the processing fluid was loaded in a lab run screw tube and bottle (Manufactured by AS ONE Corporation) and stored in a thermostatic chamber at 60 degrees C. for one week and evaluated according to the following criteria from the appearance of the processing fluid before and after the storage. The processing fluid is usable for practical purpose when graded A or B.

A: Separation by concentration is not present at all
B: Separation by concentration is slightly present
C: Phase separated into top and bottom layers

TABLE 1

| Processing liquid | Solvent 1 Type | Parts | Solvent 2 Type | Parts | Surfactant Type | Parts | Defoaming agent Type | Parts |
|---|---|---|---|---|---|---|---|---|
| Processing fluid 1 | Glycerin | 20 | SOLFIT MMB | 10 | BYK348 | 0.5 | AD01 | 0.1 |
| Processing fluid 2 | Glycerin | 20 | SOLFIT MMB | 10 | BYK348 | 0.5 | AD01 | 0.1 |
| Processing fluid 3 | Glycerin | 20 | SOLFIT MMB | 10 | BYK348 | 0.5 | AD01 | 0.1 |
| Processing fluid 4 | Glycerin | 20 | SOLFIT MMB | 10 | BYK348 | 0.5 | AD01 | 0.1 |
| Processing fluid 5 | Glycerin | 20 | SOLFIT MMB | 10 | BYK348 | 0.5 | AD01 | 0.1 |
| Processing fluid 6 | Glycerin | 20 | SOLFIT MMB | 10 | BYK348 | 0.5 | AD01 | 0.1 |
| Processing fluid 7 | Glycerin | 20 | SOLFIT MMB | 10 | BYK348 | 0.5 | AD01 | 0.1 |
| Processing fluid 8 | Glycerin | 20 | SOLFIT MMB | 10 | BYK348 | 0.5 | AD01 | 0.1 |
| Processing fluid 9 | Glycerin | 20 | SOLFIT MMB | 10 | BYK348 | 0.5 | AD01 | 0.1 |
| Processing fluid 10 | Glycerin | 20 | SOLFIT MMB | 10 | BYK348 | 0.5 | AD01 | 0.1 |
| Processing fluid 11 | Glycerin | 20 | SOLFIT MMB | 10 | BYK348 | 0.5 | AD01 | 0.1 |
| Processing fluid 12 | Glycerin | 20 | SOLFIT MMB | 10 | BYK348 | 0.5 | AD01 | 0.1 |
| Processing fluid 13 | Glycerin | 20 | SOLFIT MMB | 10 | BYK348 | 0.5 | AD01 | 0.1 |
| Processing fluid 14 | Glycerin | 20 | SOLFIT MMB | 10 | BYK348 | 1 | AD01 | 0.1 |
| Processing fluid 15 | Glycerin | 20 | SOLFIT MMB | 10 | BYK348 | 0.2 | AD01 | 0.1 |
| Processing fluid 16 | Glycerin | 20 | SOLFIT MMB | 10 | BYK348 | 1.9 | AD01 | 0.1 |
| Processing fluid 17 | Glycerin | 20 | SOLFIT MMB | 10 | BYK348 | 2 | AD01 | 0.1 |
| Processing fluid 18 | Glycerin | 20 | SOLFIT MMB | 10 | BYK348 | 0.06 | AD01 | 0.1 |
| Processing fluid 19 | Glycerin | 20 | SOLFIT MMB | 10 | BYK348 | 0.05 | AD01 | 0.1 |
| Processing fluid 20 | Glycerin | 20 | SOLFIT MMB | 10 | Surfynol 465 | 1 | AD01 | 0.1 |
| Processing fluid 21 | Glycerin | 20 | SOLFIT MMB | 10 | BYK348 | 1 | AD01 | 0.1 |
| Processing fluid 22 | Glycerin | 20 | SOLFIT MMB | 10 | BYK348 | 1 | AD01 | 0.1 |
| Processing fluid 23 | Glycerin | 20 | SOLFIT MMB | 10 | BYK348 | 1 | AD01 | 0.1 |
| Processing fluid 24 | Glycerin | 20 | SOLFIT MMB | 10 | BYK348 | 1 | AD01 | 0.1 |
| Processing fluid 25 | Glycerin | 20 | SOLFIT MMB | 10 | BYK348 | 0.5 | AD01 | 0.1 |
| Processing fluid 26 | Glycerin | 20 | SOLFIT MMB | 10 | BYK348 | 0.5 | AD01 | 0.1 |
| Processing fluid 27 | Glycerin | 20 | SOLFIT MMB | 10 | BYK348 | 0.5 | AD01 | 0.1 |
| Processing fluid 28 | Glycerin | 20 | SOLFIT MMB | 10 | BYK348 | 0.5 | AD01 | 0.1 |
| Processing fluid 29 | Glycerin | 20 | SOLFIT MMB | 10 | BYK348 | 0.5 | AD01 | 0.1 |
| Processing fluid 30 | Glycerin | 20 | SOLFIT MMB | 10 | BYK348 | 0.5 | AD01 | 0.1 |

TABLE 1-continued

| Processing liquid | Preservatives and corrosion inhibitor Type | Parts | Metal salt Type | Parts | Metal ion (g/L) |
|---|---|---|---|---|---|
| Processing fluid 1 | PROXEL LV | 0.1 | $Ca(NO_3)_2 \cdot 4H_2O$ | 12 | 20.4 |
| Processing fluid 2 | PROXEL LV | 0.1 | NaCl | 8 | 31.5 |
| Processing fluid 3 | PROXEL LV | 0.1 | $Ca(NO_3)_2 \cdot 4H_2O$ | 2.5 | 4.2 |
| Processing fluid 4 | PROXEL LV | 0.1 | $Ca(NO_3)_2 \cdot 4H_2O$ | 0.3 | 0.5 |
| Processing fluid 5 | PROXEL LV | 0.1 | $Ca(NO_3)_2 \cdot 4H_2O$ | 24 | 40.7 |
| Processing fluid 6 | PROXEL LV | 0.1 | $Ca(NO_3)_2 \cdot 4H_2O$ | 28 | 47.5 |
| Processing fluid 7 | PROXEL LV | 0.1 | $Ca(NO_3)_2 \cdot 4H_2O$ | 12 | 20.4 |
| Processing fluid 8 | PROXEL LV | 0.1 | $Ca(NO_3)_2 \cdot 4H_2O$ | 12 | 20.4 |
| Processing fluid 9 | PROXEL LV | 0.1 | $Ca(NO_3)_2 \cdot 4H_2O$ | 12 | 20.4 |
| Processing fluid 10 | PROXEL LV | 0.1 | $Ca(NO_3)_2 \cdot 4H_2O$ | 12 | 20.4 |
| Processing fluid 11 | PROXEL LV | 0.1 | $Ca(NO_3)_2 \cdot 4H_2O$ | 12 | 20.4 |
| Processing fluid 12 | PROXEL LV | 0.1 | $Ca(NO_3)_2 \cdot 4H_2O$ | 12 | 20.4 |
| Processing fluid 13 | PROXEL LV | 0.1 | $Ca(NO_3)_2 \cdot 4H_2O$ | 12 | 20.4 |
| Processing fluid 14 | PROXEL LV | 0.1 | $Ca(NO_3)_2 \cdot 4H_2O$ | 12 | 20.4 |
| Processing fluid 15 | PROXEL LV | 0.1 | $Ca(NO_3)_2 \cdot 4H_2O$ | 12 | 20.4 |
| Processing fluid 16 | PROXEL LV | 0.1 | $Ca(NO_3)_2 \cdot 4H_2O$ | 12 | 20.4 |
| Processing fluid 17 | PROXEL LV | 0.1 | $Ca(NO_3)_2 \cdot 4H_2O$ | 12 | 20.4 |
| Processing fluid 18 | PROXEL LV | 0.1 | $Ca(NO_3)_2 \cdot 4H_2O$ | 12 | 20.4 |
| Processing fluid 19 | PROXEL LV | 0.1 | $Ca(NO_3)_2 \cdot 4H_2O$ | 12 | 20.4 |
| Processing fluid 20 | PROXEL LV | 0.1 | $Ca(NO_3)_2 \cdot 4H_2O$ | 12 | 20.4 |
| Processing fluid 21 | PROXEL LV | 0.1 | $Ca(NO_3)_2 \cdot 4H_2O$ | 0.2 | 0.3 |
| Processing fluid 22 | PROXEL LV | 0.1 | $Ca(NO_3)_2 \cdot 4H_2O$ | 32 | 54.3 |
| Processing fluid 23 | PROXEL LV | 0.1 | $Ca(NO_3)_2 \cdot 4H_2O$ | 12 | 20.4 |
| Processing fluid 24 | PROXEL LV | 0.1 | $Ca(NO_3)_2 \cdot 4H_2O$ | 12 | 20.4 |
| Processing fluid 25 | PROXEL LV | 0.1 | $Ca(NO_3)_2 \cdot 4H_2O$ | 12 | 20.4 |
| Processing fluid 26 | PROXEL LV | 0.1 | $Ca(NO_3)_2 \cdot 4H_2O$ | 12 | 20.4 |
| Processing fluid 27 | PROXEL LV | 0.1 | $Ca(NO_3)_2 \cdot 4H_2O$ | 12 | 20.4 |
| Processing fluid 28 | PROXEL LV | 0.1 | $Ca(NO_3)_2 \cdot 4H_2O$ | 12 | 20.4 |
| Processing fluid 29 | PROXEL LV | 0.1 | $Ca(NO_3)_2 \cdot 4H_2O$ | 12 | 20.4 |
| Processing fluid 30 | PROXEL LV | 0.1 | $Ca(NO_3)_2 \cdot 4H_2O$ | 12 | 20.4 |

| Processing liquid | Organopolysiloxane particle liquid dispersion Type | Mw | Parts | Deionized water Parts | 150 ms dynamic surface tension (mN/m) | Storage stability |
|---|---|---|---|---|---|---|
| Processing fluid 1 | Liquid dispersion 1 | 88000 | 10 | Balance | 31 | B |

TABLE 1-continued

| | | | | | | |
|---|---|---|---|---|---|---|
| Processing fluid 2 | Liquid dispersion 1 | 88000 | 10 | Balance | 30 | B |
| Processing fluid3 | Liquid dispersion 1 | 88000 | 10 | Balance | 29 | B |
| Processing fluid 4 | Liquid dispersion 1 | 88000 | 10 | Balance | 33 | B |
| Processing fluid 5 | Liquid dispersion 1 | 88000 | 10 | Balance | 33 | B |
| Processing fluid 6 | Liquid dispersion 1 | 88000 | 10 | Balance | 31 | B |
| Processing fluid 7 | Liquid dispersion 2 | 20000 | 10 | Balance | 29 | B |
| Processing fluid 8 | Liquid dispersion 3 | 17000 | 10 | Balance | 28 | B |
| Processing fluid 9 | Liquid dispersion 4 | 5000 | 10 | Balance | 29 | B |
| Processing fluid 10 | Liquid dispersion 5 | 200000 | 10 | Balance | 31 | B |
| Processing fluid 11 | Liquid dispersion 6 | 220000 | 10 | Balance | 32 | B |
| Processing fluid 12 | Liquid dispersion 7 | 500000 | 10 | Balance | 30 | B |
| Processing fluid 13 | Liquid dispersion 8 | 98000 | 10 | Balance | 28 | B |
| Processing fluid 14 | Liquid dispersion 1 | 88000 | 10 | Balance | 24 | B |
| Processing fluid 15 | Liquid dispersion 1 | 88000 | 10 | Balance | 41 | B |
| Processing fluid 16 | Liquid dispersion 1 | 88000 | 10 | Balance | 20 | B |
| Processing fluid 17 | Liquid dispersion 1 | 88000 | 10 | Balance | 18 | B |
| Processing fluid 18 | Liquid dispersion 1 | 88000 | 10 | Balance | 50 | B |
| Processing fluid 19 | Liquid dispersion 1 | 88000 | 10 | Balance | 52 | B |
| Processing fluid 20 | Liquid dispersion 1 | 88000 | 10 | Balance | 30 | B |
| Processing fluid 21 | Liquid dispersion 1 | 88000 | 10 | Balance | 31 | B |
| Processing fluid 22 | Liquid dispersion 1 | 88000 | 10 | Balance | 30 | B |
| Processing fluid 23 | Liquid dispersion 9 | 4200 | 10 | Balance | 29 | B |
| Processing fluid 24 | Liquid dispersion 10 | 540000 | 10 | Balance | 30 | B |
| Processing fluid 25 | Liquid dispersion 11 | 88000 | 10 | Balance | 29 | A |
| Processing fluid 26 | Liquid dispersion 12 | 88000 | 10 | Balance | 34 | A |
| Processing fluid 27 | Liquid dispersion 13 | 88000 | 10 | Balance | 35 | A |

TABLE 1-continued

| | | | | | | |
|---|---|---|---|---|---|---|
| Processing fluid 28 | Liquid dispersion 14 | 88000 | 10 | Balance | 31 | A |
| Processing fluid 29 | Liquid dispersion 15 | 88000 | 10 | Balance | 38 | A |
| Processing fluid 30 | Liquid dispersion 16 | 88000 | 10 | Balance | 38 | A |

The materials in the Table represent the following.

SOLFIT MMB: 3-methoxy-3-methyl-1-butanol (manufactured by KURARAY CO., LTD.)

SURFYNOL 465: Acetylene-based surfactant (manufactured by Nisshin Chemical Co., Ltd.)

BYK348: Silicone-based surfactant (manufactured by BYK-Chemie GmbH)

AD01: ENVIROGEM AD01 (manufactured by Air Products and Chemicals, Inc.)

PROXEL LV: Benzisothiazolin-3-one solution (manufactured by LONZA Japan)

The dynamic surface tension of the obtained processing fluids at a life time of 150 msec at 25 degrees C. was shown in Table 1.

Preparation of Liquid Dispersion of Pigment

After the following recipe was preliminarily mixed, the mixture was subjected to circulation dispersion for seven hours with a disk type bead mill (KDL type, media: zirconia ball having a diameter of 0.3 mm, manufactured by SHIN-MARU ENTERPRISES CORPORATION) to obtain a liquid dispersion of pigment (pigment concentration: 15 percent by mass). Parts below represents parts by mass and the total is 100 parts by mass.

Carbon black pigment (MONARCH 800, manufactured by Cabot Corporation): 15 parts

Anionic surfactant (PIONINE A-51-B, manufactured by TAKEMOTO OIL & FAT Co., Ltd.): 3 parts Deionized water: balance Manufacturing of Liquid Dispersion of Resin Particle A liquid dispersion 1 of resin particle was obtained in the following manner.

1,6-Hexane diol as a diol and adipic acid as a dicarboxylic acid were loaded in a 1-L four-necked flask equipped with a nitrogen introducing tube, dehydrating tube, stirrer, and thermocouple to achieve a COOH to OH ratio of 1.05:1. Titanium tetraisopropoxide at 300 ppm was added to the flask to allow reaction in a nitrogen atmosphere while flowing water out followed by heating up to 230 degrees C. to complete the reaction. Thereafter, the solution was allowed to react at a degree of vacuum at 0.6 kPa for four hours to obtain polyol 1 with an acid value of 15.

Thereafter, 150 parts of polyol, 22 parts of isophorone diisocyanate, 4.5 parts of dimethylol propionic acid, and 51 parts of methylethyl ketone dehydrated with a molecular sieve were placed in a 300 mL separable flask equipped with a stirrer, a thermometer, and an efflux tube followed by heating to 70 degrees C. in a nitrogen atmosphere. Thereafter, 200 ppm of tin 2-ethyl hexanoate was added to the obtained mixture to allow reaction at 70 degrees C. for three to ten hours while the concentration of isocyanate in the system was measured. Thereafter, the temperature in the system was lowered to 40 degrees C. and 5.1 parts of triethyl amine was added. A total of 154 parts of deionized water was added while the entire was stirred at 300 rpm. Subsequent to one hour stirring, 2.2 parts of diethylene triamine was added followed by stirring for one hour. Thereafter, the resulting liquid was cooled down to room temperature followed by distilling away the solvent by an evaporator to achieve a solid content portion of 30 percent, thereby obtaining a liquid dispersion 1 of resin particle.

A liquid dispersion 2 of resin particle was obtained in the following manner.

First, 50 parts of polycarbonate diol (T5651, manufactured by Asahi Kasei Corporation), 6.5 parts of dimethylol propionic acid, 32 parts of isophorone diisocyanate, and 59 parts of methylethyl ketone dehydrated with a molecular sieve were placed in a 500 mL separable flask equipped with a stirrer, a thermometer, and an efflux tube followed by heating to 70 degrees C. in a nitrogen atmosphere. Thereafter, 200 ppm of tin 2-ethyl hexanoate was added to the obtained mixture to allow reaction at 70 degrees C. for 3 to 10 hours while the concentration of isocyanate in the system was measured. Thereafter, the temperature in the system was lowered to 40 degrees C. and 7.4 parts of triethyl amine was added. A total of 178 parts of deionized water was added while the entire was stirred at 300 rpm. Subsequent to one hour stirring, 3.2 parts of diethylene triamine was added followed by stirring for 3 to 6 hours. Thereafter, the resulting liquid was cooled down to room temperature followed by distilling away the solvent by an evaporator. Deionized water was added such that the solid content portion was 30 percent to obtain a liquid dispersion 2 of resin particle.

Preparation of Ink 1

| | |
|---|---|
| Glycerin: | 20.0 parts |
| SOLFIT MMB: | 10 parts |
| BYK348: | 0.5 parts |
| AD01: | 0.1 parts |
| PROXEL LV: | 0.5 parts |
| Liquid dispersion 1 of pigment: | 30.0 parts |
| Liquid dispersion 1 of resin particle: | 20.0 parts |
| Deionized water: | balance |

After the materials of the formulation above other than the liquid dispersion 1 of pigment and the liquid dispersion 1 of resin particle were dissolved in deionized water to prepare a vehicle, the vehicle was mixed with the liquid dispersion 1 of resin particle and finally with the liquid dispersion 1 of pigment followed by filtering with a filter having an average pore size of 0.8 µm to obtain an ink 1. Parts mentioned above represents parts by mass and the total is 100 parts by mass.

Preparation of Ink 2

Ink 2 was obtained in the same manner as for ink 1 except that the liquid dispersion 1 of resin particle of ink 1 to the liquid dispersion 2 of resin particle.

Printing Method

An inkjet printer Ri100 filled with each of the processing fluids discharged it to POLYESTER TROPICAL (manufactured by Shikisensha CO., LTD.) cut to A4 size with an attached amount of 1.0 mg/cm² as a pre-processing process.

Thereafter, the pre-processed POLYESTER TROPICAL was set in an inkjet printer Ri 6000 filled with the ink. The inkjet printer Ri 6000 formed a solid image with ink 1 or ink 2 at 2.0 mg/cm$^2$ on where the processing fluid had been attached. The solid image was dried in a heated wind circulating thermostatic chamber set at 160 degrees C. for 10 minutes to evaluate fastness against rubbing and texture of the image. The combinations of the processing fluids and the inks are shown in Table 2.

Fastness Against Rubbing

Dry fastness against rubbing was evaluated according to JIS L0849 type II format.

The solid image is allowable for practical purpose when graded C or above.

Evaluation Criteria

A: Class 4.5 or higher
B: Class 4.0
C: Class 3.5
D: Class 3.0 or lower

Texture

Texture or stiffness of the solid image cut to a 9 cm square was evaluated according to JIS L1069 format.

The processing fluid is usable for practical purpose when graded C or above.

Evaluation Criteria

A: less than 30 g
B: 30 to less than 40 g
C: 40 to less than 50 g
D: 50 g or greater The results are shown in Table 2.

TABLE 2

| | Processing fluid | Ink | Texture | Fastness against rubbing |
|---|---|---|---|---|
| Example 1 | Processing fluid 1 | Ink 1 | A | A |
| Example 2 | Processing fluid 2 | Ink 1 | A | A |
| Example 3 | Processing fluid 3 | Ink 1 | B | A |
| Example 4 | Processing fluid 4 | Ink 1 | C | A |
| Example 5 | Processing fluid 5 | Ink 1 | A | B |
| Example 6 | Processing fluid 6 | Ink 1 | A | C |
| Example 7 | Processing fluid 7 | Ink 1 | A | A |
| Example 8 | Processing fluid 8 | Ink 1 | B | B |
| Example 9 | Processing fluid 9 | Ink 1 | C | C |
| Example 10 | Processing fluid 10 | Ink 1 | A | A |
| Example 11 | Processing fluid 11 | Ink 1 | B | B |
| Example 12 | Processing fluid 12 | Ink 1 | B | B |
| Example 13 | Processing fluid 13 | Ink 1 | A | A |
| Example 14 | Processing fluid 14 | Ink 1 | A | B |
| Example 15 | Processing fluid 15 | Ink 1 | B | A |
| Example 16 | Processing fluid 16 | Ink 1 | A | B |
| Example 17 | Processing fluid 17 | Ink 1 | A | C |
| Example 18 | Processing fluid 18 | Ink 1 | B | A |
| Example 19 | Processing fluid 19 | Ink 1 | C | A |
| Example 20 | Processing fluid 20 | Ink 1 | B | B |
| Example 21 | Processing fluid 1 | Ink 2 | A | B |
| Example 22 | Processing fluid 25 | Ink 1 | A | A |
| Example 23 | Processing fluid 26 | Ink 1 | A | A |
| Example 24 | Processing fluid 27 | Ink 1 | A | A |
| Example 25 | Processing fluid 28 | Ink 1 | A | A |
| Example 26 | Processing fluid 29 | Ink 1 | A | A |
| Example 27 | Processing fluid 30 | Ink 1 | A | A |
| Comparative Example 1 | Processing fluid 21 | Ink 1 | D | A |
| Comparative Example 2 | Processing fluid 22 | Ink 1 | A | D |
| Comparative Example 3 | Processing fluid 23 | Ink 1 | D | D |
| Comparative Example 4 | Processing fluid 24 | Ink 1 | D | D |

As seen in the results shown in Table 2, the textures and fastness against rubbing were sufficient for practical purpose in each Example. However, the textures and fastness against rubbing were not satisfactory at the same time in each Comparative Example.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A processing fluid, comprising:
a metal ion;
an organopolysiloxane; and
a compound represented by the following Chemical Formula (1)

$$CH_3(CH_2)_mO(C_2H_4O)_nH \qquad (1)$$

wherein m represents an integer of from 10 to 16 and n represents an integer of from 6 to 12;
wherein a content of the metal ion in the processing fluid is from 0.5 to 50 g/L; and
wherein the organopolysiloxane has a weight average molecular of from 5,000 to 500,000.

2. The processing fluid according to claim 1, wherein the organopolysiloxane comprises at least one of dimethyl polysiloxane and amino-modified organopolysiloxane.

3. The processing fluid according to claim 1, wherein the organopolysiloxane comprises particles.

4. The processing fluid according to claim 1, wherein the processing fluid has a dynamic surface tension of from 20 to 50 mN/m at a life time of 150 ms at 25 degrees C.

5. The processing fluid according to claim 1, further comprising a silicone-based surfactant.

6. An ink set; comprising:
the processing fluid of claim 1; and
an ink.

7. The ink set according to claim 6, wherein the ink comprises a polyester-based urethane resin.

8. An inkjet printing device, comprising:
a device containing the processing fluid of claim 1, the device configured to apply the processing fluid to a recording medium; and
a discharging device configured to discharge an ink.

9. An inkjet printing method, comprising:
applying the processing fluid of claim 1 to a recording medium; and
discharging an ink to the recording medium.

* * * * *